May 23, 1933. H. M. SVEBELIUS 1,910,649
MACHINE TOOL
Filed Feb. 5, 1930
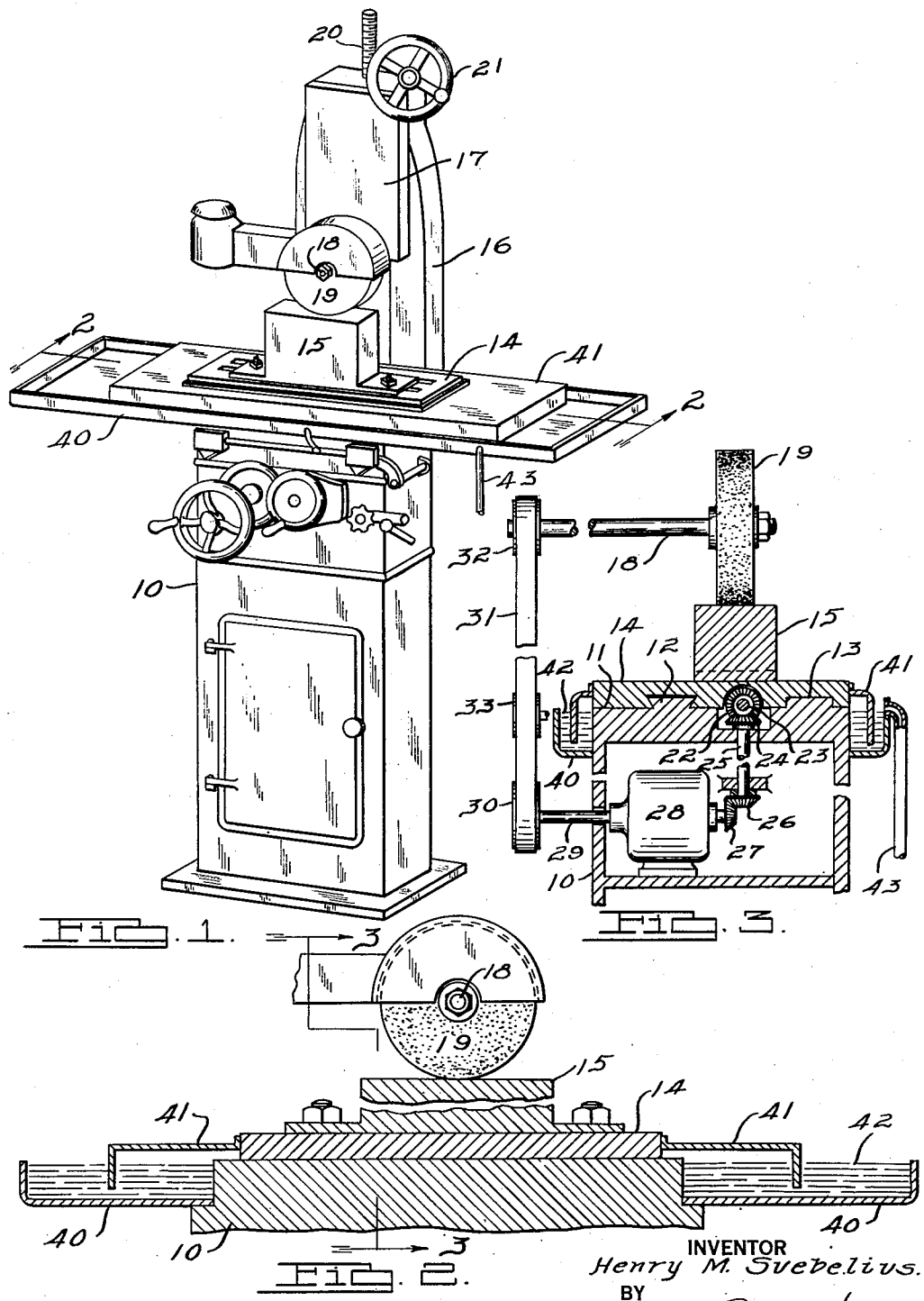
INVENTOR
Henry M. Svebelius.
BY
Harness, Dickey, Pierce & Haun
ATTORNEY Patented May 23, 1933

1,910,649

UNITED STATES PATENT OFFICE

HENRY M. SVEBELIUS, OF EVANSTON, ILLINOIS, ASSIGNOR TO MICHIGAN TOOL COMPANY, A CORPORATION OF MICHIGAN

MACHINE TOOL

Application filed February 5, 1930. Serial No. 425,935.

This invention relates to machine tools and particularly to machine tools having slidable carriages or like parts thereon, the principal object being the provision of a new and novel means for sealing the ways of such carriages against foreign material.

There is a great class of machine tools which are provided with horizontally movable carriages for supporting work, tools, etc., and in which it is desirable to maintain the ways upon which the carriage is slidable against all possible wear. The reason for this is, of course, obvious, for inasmuch as either the work or the tool is carried by the carriage, any wear permitting undesirable movement of the carriage on the ways will affect the accuracy of the work being performed by the machine tool. Various means have heretofore been proposed for sealing such ways against the entrance of foreign material. Most of these means have been in connection with machine tools of the grinder type, for in such cases the particles of abrasive worn from the grinding element are more liable to find their way to the surface of the ways and to cause more damage in such case than in other classes of machine tools. Such sealing means have sometimes taken the form of horizontally disposed curtains attached to the carriage and maintained in taut position by means of weights or rollers or like means. While this type of sealing means is of considerable aid in preventing foreign matter from reaching the ways it is not at all a complete seal for in such cases the sides are invariably open, which permits foreign matter to find its way under the curtains.

The present invention contemplates the provision of a liquid seal for completely sealing the surface of the ways from contact with the outside air and so formed as to provide a simple and absolute seal for the ways. The particular manner of affecting this seal is to provide on the machine an upwardly opening concave pan-like structure extending around the carriage and extending a substantial amount in either direction of the neutral or central position of the carriage in the direction of carriage movement. I then secure to the carriage itself a downwardly opening or concave hood or pan-like structure which projects down into the pan carried by the machine base. This second pan is tightly sealed to the carriage and the first pan is filled with water or other liquid, whereby a liquid seal is provided between the ways and the air exterior to the pan carried by the carriage. This provides a construction which absolutely seals the ways of the carriage against contact with foreign material.

It is, therefore, the principal object of the present invention to provide a liquid seal for the ways of sliding carriages on machine tools, and more specifically, to provide such a seal by means of a pair of co-operating pan or other members, one movable with the carriage and one stationary, and with the space between them closed to the circulation of air by a body of liquid. Further objects will be apparent in the following specification, reference being had to the accompanying drawing, in which:

Fig. 1 is a perspective view of a grinding machine.

Fig. 2 is an enlarged fragmentary sectional view taken vertically through the length of the carriage of the machine shown in Fig. 1, as on the line 2—2 of Fig. 1.

Fig. 3 is a fragmentary vertical sectional view taken as on the line 3—3 of Fig. 2.

In the accompanying drawing is shown a grinding machine of the surface grinding type, in connection with which is a suitable embodiment of the present invention. It is to be understood, however, that the present invention is applicable generally to grinding or other machines having carriages or other horizontally movable members to which a seal of the type herein disclosed may be applied.

For the purpose of illustrating the present invention the machine in the drawing is shown as comprising a base 10 having a horizontal upper surface 11 upon which is formed longitudinally extending ways 12 and 13 respectively. Received upon the surface 11 and guided by the ways 12 and 13 for longitudinally slidable movement is a carriage 14, upon which a piece of work 15 is secured. Upon the rear side of the body 10 is provided an upwardly extending head 16, upon which is mounted for vertical slidable movement a member 17 which rotatably supports a horizontally extending shaft 18 which is provided with a grinding wheel 19 disposed over the carriage 14 so as to enable it to engage the work 15. The vertical position of the grinding wheel 19 may be controlled in a conventional manner through the screw 20 and hand wheel 21. The carriage 14 may be driven in a conventional manner by means of a gear such as 22 secured to a screw such as 23 extending longitudinally of the carriage 14 and engaging a suitable nut (not shown) secured to the table 14, the gear 22 being driven by a co-operating gear 24, shaft 25 and co-operating gears 26 and 27 from an electric motor such as 28, or by any other suitable means. The shaft 29 of the motor may be extended as indicated in Fig. 3 and be provided with a pulley such as 30, which may be connected by a belt such as 31 to a pulley such as 32 secured to the shaft 18 of the grinding wheel 19, suitable means such as an idler pulley 33 being provided for maintaining the tension of the belt 31 during vertical adjustment of the grinding wheel 19.

In accordance with the present invention I secure to the base 10 of the machine an upwardly opening pan member 40. This pan member may be cast integrally with the base 10 or may be formed separately therefrom and secured thereto, it being understood in any case that the pan 40 is formed to hold a supply of liquid. As best indicated in Figs. 2 and 3, the upper edge of the pan 40 projects up to a point substantially flush with the lower face of the table 14, although, as will be hereinafter apparent, its vertical position may be varied to a greater or lesser extent. Furthermore, this pan 40, while not necessarily of much greater width than the width of the carriage 14 is of substantially greater length in order to permit the extent of carriage movement necessary in the machine. I then secure to the carriage 14 a downwardly opening hood or pan-like structure 41 similar in shape to the pan 40. The pan 41 may be formed either integrally with the carriage 14 or separately therefrom and secured to the carriage 14 over the perimeter thereof. It is, of course, not necessary that the pan 41 be secured to the sides of the carriage 14, but it may, if desired, overlap the top surface thereof and be secured to such top surface, but I prefer the construction shown inasmuch as it does not interfere with the surface of the carriage. The pan 41 is of sufficient depth so that it projects downwardly between the sides of the pan 40 and the corresponding sides of the base 10 to a point adjacent to but spaced from the bottom of the pan 40. The ends of the pan 41 are preferably positioned at a distance substantially midway between the corresponding end of the base 10 and the pan 40 when the carriage 14 is in its neutral or central position on the base, thus permitting the carriage to move an equal distance either way from central position during movement thereof. I then fill the lower pan 40 with water or other liquid 42, and it will be apparent that by thus doing the ways 12 and 13 are completely sealed from possible contact with any foreign matter that may be carried by the air exterior to the pan 41, or that might otherwise find its way into contact with the ways 12 and 13.

In some cases the usual grinding, or other cutting compound employed in machines of this type may be employed in place of the water shown, in which case an overflow pipe such as 43 may be provided for maintaining the level of the liquid at a predetermined point.

Although I have shown the present invention in connection with a grinding machine, in which type of machines it is undoubtedly of great importance, it will be equally obvious that it may be applied to milling or other machine tools with equal efficiency, and I do not limit myself in this respect.

Formal changes may be made in the specific embodiment of the invention described without departing from the spirit and substance of the broad invention, the scope of which is commensurate with the appended claims.

What I claim is:

1. In combination in a machine tool having a movable work support, ways for supporting said support, and means for sealing said ways against foreign material, said means comprising a pair of generally horizontally disposed oppositely arranged concave members, the upper of which is sealed to said support and the other of which is stationary and adapted at all times to contain a sealing liquid extending to a point above the lower edge of said movable member.

2. In a machine tool, in combination, a supporting structure having horizontal ways thereon, a carriage slidable on said ways, an upwardly opening pan carried by said structure and disposed around said carriage, and an inverted pan sealed to said carriage above said ways and movable bodily therewith, said inverted pan projecting downwardly into the first mentioned pan, said first mentioned pan being filled with a liquid to a point above the lower edge of said inverted pan.

3. In a machine tool having a supporting structure and a carriage horizontally slidably supported thereon for longitudinal movement, an upwardly opening liquid receptacle extending around said carriage and fixed to said supporting structure, and a downwardly opening hood sealed to said carriage and projecting down into said receptacle whereby to seal the relatively sliding surfaces between said carriage and said structure when said receptacle is filled with a liquid.

4. In a machine tool, in combination, a base provided with a horizontally disposed way thereon, a carriage slidably supported by said base and guided in its sliding movement by said way, an open topped liquid receptacle carried by said base below and extending horizontally beyond the movable positions of said carriage, and a hood member carried by and bodily movable with said carriage projecting downwardly into said receptacle whereby to effect a liquid seal for said way.

5. In a machine tool, in combination, a base provided with a horizontally disposed way thereon, a carriage slidably supported by said base and guided in its sliding movement by said way, an open topped liquid receptacle carried by said base below and extending horizontally beyond the movable positions of said carriage, and a hood member carried by and bodily movable with said carriage projecting downwardly into said receptacle whereby to effect a liquid seal for said way, each end of said hood being positioned substantially midway between the corresponding end of said receptacle and the corresponding end of said way when said carriage is disposed midway between the extremities of its movable positions.

6. In a device of the character described: a tool-carrying support and a work support, one of said supports being movable; ways for supporting said movable support; and means for sealing said ways against foreign material comprising a pair of substantially horizontally disposed oppositely concave members, one of which is sealed to said movable support and the other of which is stationary and adapted to contain a liquid extending to a point above the lower edge of said movable member.

7. A device of the character described comprising: a tool support and a work support one of said supports being movable; a slidable connection between said supports; and means for sealing said slidable connection against foreign material comprising a pair of generally horizontally disposed oppositely concave members, one of which is secured to said movable support and the other of which is secured to said stationary support and adapted to receive a liquid extending to a point above the lower edge of said other member.

HENRY M. SVEBELIUS.